United States Patent
Matsuura et al.

[11] Patent Number: 5,345,687
[45] Date of Patent: Sep. 13, 1994

[54] NONCONTACT TRACING CONTROL DEVICE

[75] Inventors: Hitoshi Matsuura, Hachioji; Eiji Matsumoto, Yamanashi, both of Japan

[73] Assignee: Fanuc, Ltd., Yamanashi, Japan

[21] Appl. No.: 842,345

[22] PCT Filed: Jul. 25, 1991

[86] PCT No.: PCT/JP91/01002
§ 371 Date: Mar. 25, 1992
§ 102(e) Date: Mar. 25, 1992

[87] PCT Pub. No.: WO92/01534
PCT Pub. Date: Feb. 6, 1992

[30] Foreign Application Priority Data

Jul. 25, 1990 [JP] Japan ............... 2-196797

[51] Int. Cl.$^5$ ............................................. G01B 11/24
[52] U.S. Cl. ........................................ 33/503; 33/546; 33/551; 356/376
[58] Field of Search ............ 356/376; 33/503, 546, 33/547, 551, 552; 364/474.18, 474.37, 474.35, 551.02

[56] References Cited

U.S. PATENT DOCUMENTS

| | | | |
|---|---|---|---|
| 4,905,158 | 2/1990 | Seki et al. | 364/474.18 |
| 5,071,252 | 12/1991 | Matsuura | 356/376 |

FOREIGN PATENT DOCUMENTS

| | | | |
|---|---|---|---|
| 0313801 | 5/1989 | European Pat. Off. | |
| 0348247 | 12/1989 | European Pat. Off. | |
| 0190607 | 10/1984 | Japan | 356/376 |
| 61-274852 | 12/1986 | Japan | |
| 64-64753 | 3/1989 | Japan | |
| 1-109058 | 4/1989 | Japan | |
| 1-188254 | 7/1989 | Japan | |
| 3-3760 | 1/1991 | Japan | |
| 3-60956 | 3/1991 | Japan | |
| 3-121754 | 5/1991 | Japan | |

*Primary Examiner*—William A. Cuchlinski, Jr.
*Assistant Examiner*—Alvin Wirthlin
*Attorney, Agent, or Firm*—Staas & Halsey

[57] ABSTRACT

In a copy control device wherein a model (6) and a workpiece moved relatively with a tracer head (4) and a tool in an X-Y plane, measured distance values to the surface of the model, which are detected by first and second non-contact detectors (5a, 5b) obliquely mounted on the tracer head (4) rotatable about a Z axis are periodically sampled to obtain the coordinate values of measured points on the surface of the model, a normal vector (Nn) on the surface of the model is calculated from three coordinate values out of four measured points (P1n−1, P1n, P2n−1, P2n) successively obtained by the both detectors, and the tracer head is rotated so as to move along a projection (N1n) of the normal vector (Nn) on the X-Y plane, so that measuring axes of the detectors are controlled to be approximately vertical to the surface of the model. After two points are selected from four measured points, such a point is selected out of the remaining two measuring two points as a third point that satisfies a condition that a point of intersection between a perpendicular from such a point to a straight line passing through the previously selected two points and the above-mentioned straight line is interposed between the previously selected two points, and that satisfies a condition that the length of the above mentioned perpendicular is larger than a predetermined value.

6 Claims, 6 Drawing Sheets

NONCONTACT TRACING CONTROL DEVICE

TECHNICAL FIELD

This Invention relates to a noncontact tracing control device, and more particularly, to a device of this kind in which a distance detector is always positioned in such a manner that a measurement axis thereof is perpendicular to a model surface, to thereby improve the tracing accuracy.

BACKGROUND ART

Noncontact tracing control devices are known in which, while an optical distance detector mounted to a tracer head Is moved along a model surface, a distance to the model surface is detected in a noncontact fashion, and the operation of a machine tool is controlled in accordance with the result of distance detection representing the model shape. This type of control device is advantageous in that the model surface is not damaged when the model surface is traced. If the ankle of inclination of the model surface is large, however, the measurement axis of the optical distance detector becomes almost parallel to the model surface, and the spot on the model surface is enlarged to an ellipsoid, thus lowering the tracing accuracy. Particularly when using a trigonometric type distance detector, measurement sometimes becomes impossible due to an interference between the optical axis and the model surface.

SUMMARY OF THE INVENTION

An object of this invention is to provide a noncontact tracing control device in which the orientation of a noncontact distance detector is controlled in accordance with an angle of inclination of a model surface in such a manner that the measurement axis of the detector is exactly or nearly perpendicular to the model surface, to thereby improve the tracing accuracy.

To achieve the above object, a noncontact tracing control device according to this invention comprises: a first detector arranged to be rotatable around a rotary axis and movable relative to a model in a direction perpendicular to the rotary axis, having a measurement axis extending obliquely with respect to the rotary axis, for measuring a distance therefrom to a point on a surface of the model in a noncontact fashion; a second detector arranged to be movable together with the first detector and having a measurement axis extending obliquely with respect to the rotary axis and shifted from the measurement axis of the first detector in a direction perpendicular to the rotary axis, for measuring a distance therefrom to another point on the surface of the model in a noncontact fashion; calculating means for calculating a normal vector of the surface of the model based on four measured distance values, which include first two values and second two values successively measured by the first and second detectors, respectively, at predetermined time intervals, while the first and second detectors are moved relative to the model, and calculating an angular position of a projection of the normal vector on a plane perpendicular to the rotary axis; and positioning means for positioning the first and second detectors at the angular position thus calculated.

As described above, according to this invention, while the first and second detectors for detecting the distances therefrom to respective different points on the model surface are moved relative to the model, a normal vector of the model surface is calculated based on four measured distance values successively measured by the first and second detectors, an angular position of a projection of the normal vector on the plane perpendicular to the common rotary axis of the two detectors is calculated, and the detectors are positioned at the calculated angular position. As a result, the detectors can be always oriented exactly or nearly perpendicular to the model surface, whereby the distances to the model surface can be accurately measured and the tracing accuracy is improved.

DESCRIPTION OF THE PREFERRED EMBODIMENTS

Figure 1:
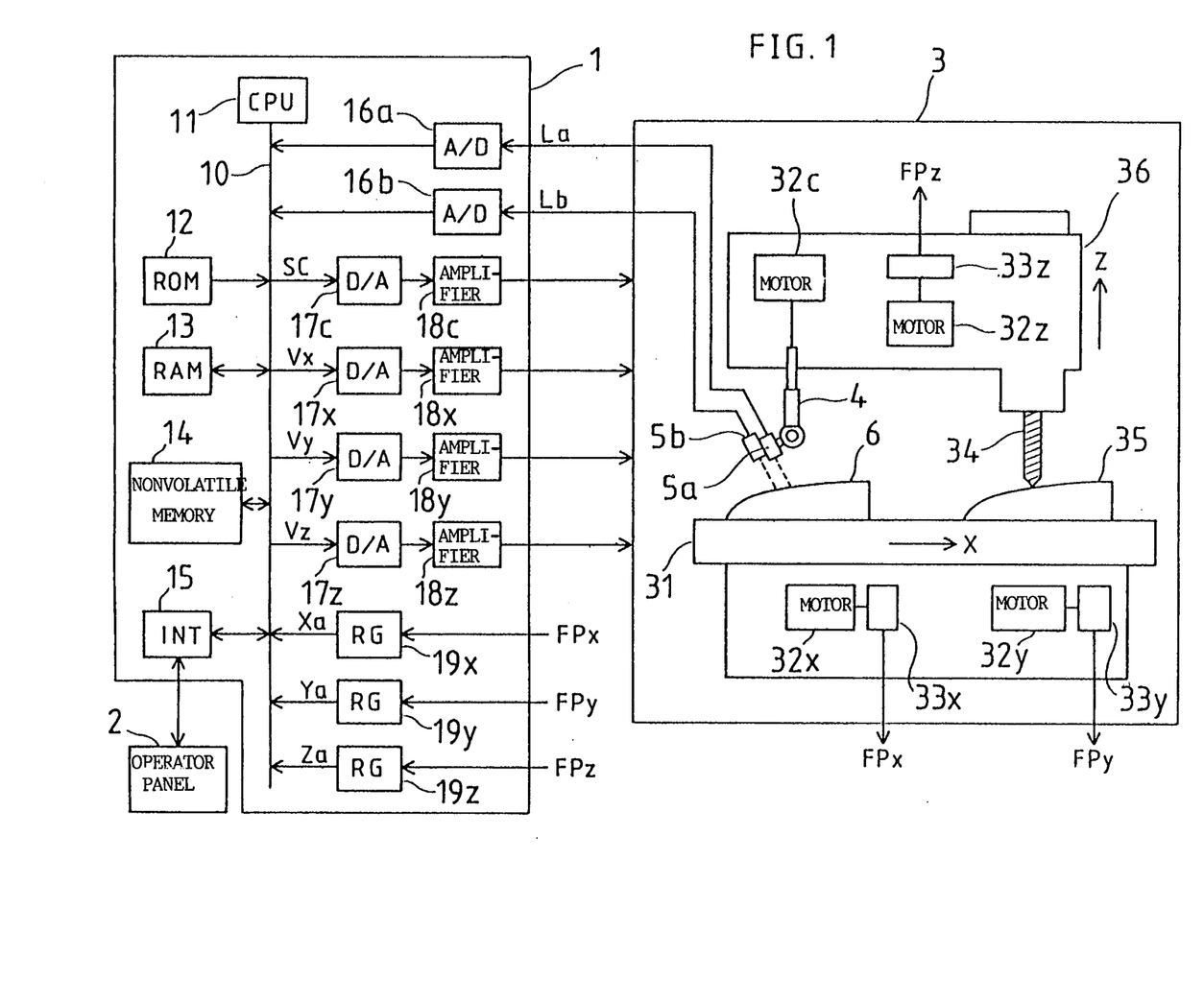
FIG. 1 is a schematic diagram illustrating a noncontact tracing control device according to an embodiment of this invention and a tracing machine tool.

Referring to FIG. 1, a tracing machine tool 3 comprises a table 31 horizontally movable in X- and Y-axis directions, and a Z-axis unit 36 vertically movable in a Z-axis direction relative to the table 31. A model 6 and a workpiece 35 are placed on the table 31, and the Z-axis unit 36 is equipped with a tracer head 4 to which first and second detectors 5a and 5b are mounted, and a tool 34. Pulse coders 33x, 33y and 33z are mounted, respectively, to servomotors 32x and 32y for driving the table and a servomotor 32z for driving the Z-axis unit. Reference numeral 32c denotes a servomotor for rotating the tracer head 4 around a vertical rotary axis (C axis shown in FIG. 2).

Figure 2:
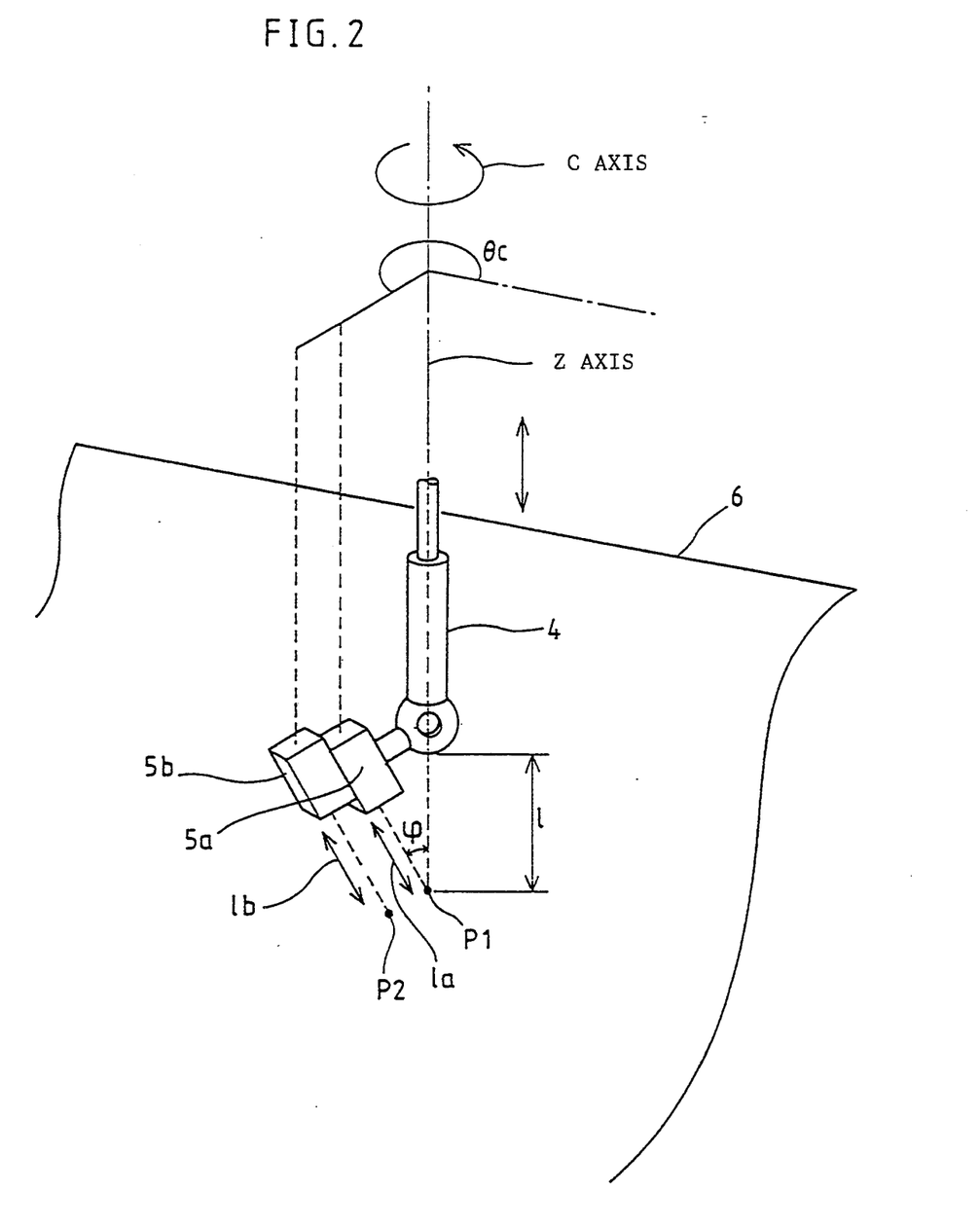
FIG. 2 is an enlarged perspective view showing in detail a tracer head and a noncontact distance detector appearing in FIG. 1.

The first and second distance detectors 5a and 5b each comprise, for example, a distance detector utilizing a reflected light amount and having a semiconductor laser or light-emitting diode as a light source, and detect the distance therefrom to the surface of the model 6 in a noncontact fashion. As shown in FIG. 2, the first detector 5a is mounted to the tracer head 4 obliquely relative thereto, and has a measurement optical axis extending obliquely at an angle of $\phi$ with respect to the rotary axis (C axis) of the tracer head. The second detector 5b is attached to an outer side surface of the first detector 5a, and has a measurement optical axis extending parallel to the optical axis of the first detector and shifted therefrom outward in a direction perpendicular to the C axis.

A noncontact tracing control device 1, which controls the operation of the tracing machine tool 3 in accordance with time outputs of the first and second detectors and the outputs of the various pulse coders, comprises a processor 11, a read-only memory (ROM) 12 storing a system program for controlling the entire operation of the tracing control device, a random-access memory (RAM) 13 for temporarily storing data including the outputs of the detectors, and a nonvolatile memory 14 backed up by a battery (not shown), for storing various parameters, such as a commanded tracing direction and commanded tracing speed manually input through an operator panel 2. The tracing control device 1 further comprises an interface 15 connected to the operator panel 2, A/D converters 16a and 16b having inputs connected to the first and second detectors 5a and 5b, respectively, D/A converters 17c, 17x, 17y and 17z, servo amplifiers 18c, 18x, 18y and 18z having inputs connected to the respective D/A converters and outputs connected to the servomotors 32c, 32x, 32y and 32z, respectively, and current position registers (RG) 19x, 19y and 19z having inputs connected to the pulse coders 33x, 33y and 33z, respectively. The processor 11 is connected to the elements 12 to 17z and 19x to 19z by a bus 10.

The operation of the tracing control device 1 and tracing machine tool 3 will be now described.

Before the tracing machine tool 3 is operated, the operator manually inputs various parameters, such as a command tracing direction and command tracing speed, through the operator panel 2, whereupon the input parameters are stored in the nonvolatile memory 14 under the control of the processor 11.

The processor 11 calculates the amounts of displacement of the individual axes, on the basis of measured distance values La and Lb detected by the first and second detectors 5a and 5b and the values stored in the current position registers 19x, 19y and 19z, and generates speed commands Vx, Vy and Vz for the respective axes in accordance with the displacements of the individual axes, the commanded tracing direction and the commanded tracing speed. The speed commands Vx, Vy and Vz are converted into digital values by the D/A converters 17x, 17y and 17z, and are supplied to the servo amplifiers 18x, 18y and 18z, respectively. The servo amplifiers 18x, 18y and 18z drive the servomotors 32x, 32y and 32z, respectively, in accordance with the speed commands, whereby the table 31 is moved in the X- and Y-axis directions and the tracer head 4 and the tool 34 are moved in the Z-axis direction. Each time the servomotors 32x to 32z make a rotation over a predetermined angle, the corresponding pulse coders 33x to 33z generate a detection pulse, and upon generation of the detection pulse, current position data Xa, Ya and Za of the X, Y and Z axes stored in the current position registers 19x, 19y and 19z are incremented or decremented depending on the direction of rotation of the corresponding motors. While in this process, the processor 11 derives a normal vector of the surface of the model 6, on the basis of the measured values La and Lb of the first and second detectors 5a and 5b sampled at predetermined time intervals.

Figure 3:
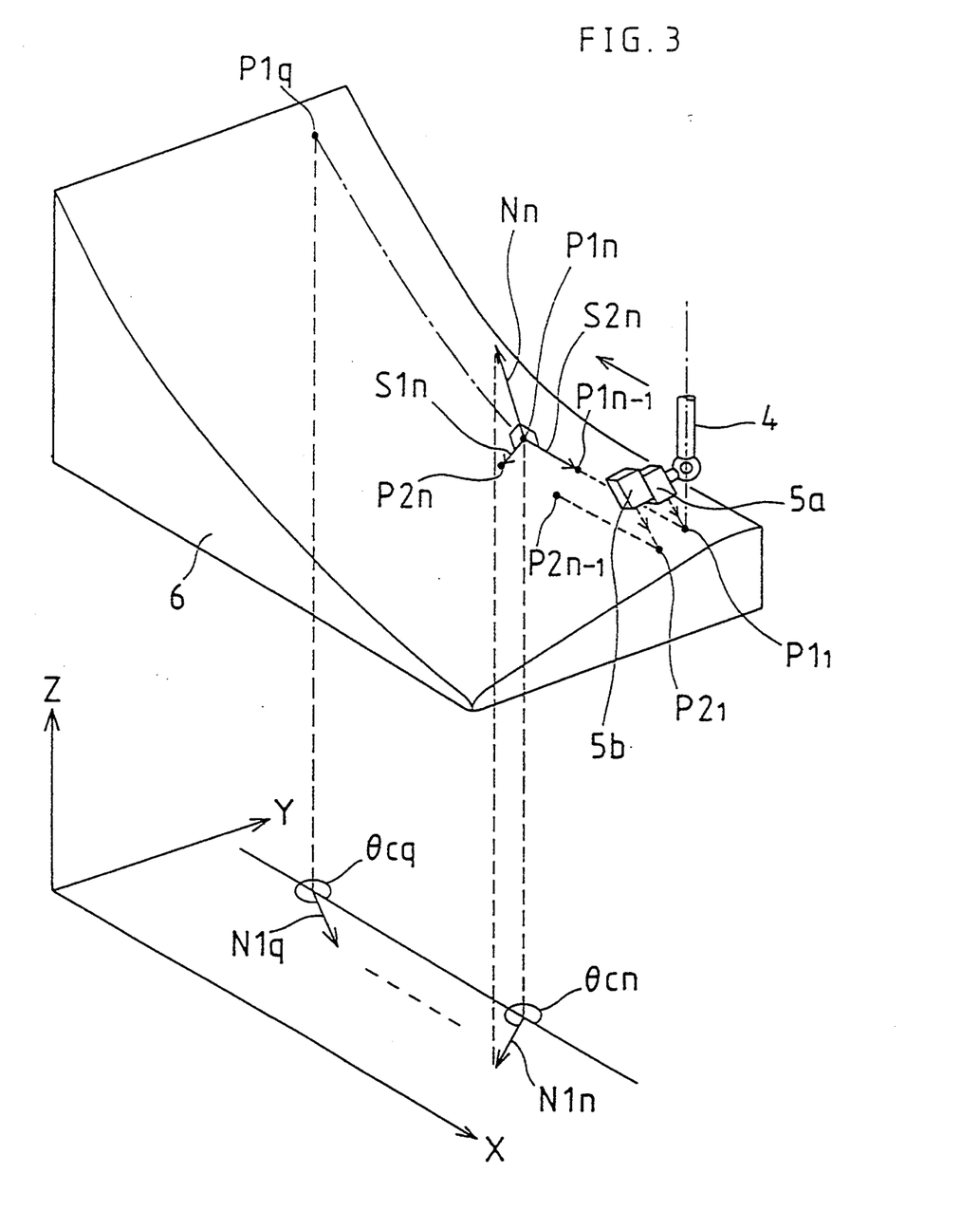
FIG. 3 is a perspective view illustrating a process for calculating the rotation angle of the tracer head by the tracing control device.

More specifically, the processor 11 samples the measured values of the first and second detectors 5a and 5b at the predetermined time intervals (Step S11 in FIG. 4), while moving the tracer head 4 and the model 6 relative to each other in the X-axis direction at the commanded tracing speed, as shown in FIG. 3, and obtains coordinates $(X1_n, Y1_n, Z1_n)$ of a point $P1_n$ ($n=1, \ldots, n-1, n$) and coordinates $(X2_n, Y2_n, Z2_n)$ of a point $P2_n$, both points being on the model 6, on the basis of the measured values of the first and second detectors 5a and 5b sampled at the present sampling time and the current position data output from the current position registers 19x, 19y and 19z. The processor 11 then obtains a surface vector $S1_n(X2_n-X1_n, Y2_n-Y1_n, Z2_n-Z1_n)$ From the coordinates of these two points (Step S12), and obtains a surface vector $S2_n(X1_{n-1}-X1_n, Y1_{n-1}-Y1_n, Z1_{n-1}-Z1_n)$ from the coordinates of two points $P1_n$ and $P1_{n-1}$ relating to the measured values of the first detector 5a sampled at the present and preceding sampling times (Step S13). Further, the processor 11 obtains an outer product $S1_n \times S2_n$ of the vectors $S1_n$ and $S2_n$, as representing a normal vector $N_n$ at the point $P_n$ (Step S14), and calculates an angle $\theta c_n(=\tan^{-1}(J_n/I_n))$ between a projection $N1_n$ of the normal vector $N_n$ onto the X-Y plane and the X axis (Step S15). Symbols $I_n$ and $J_n$ represent the X-axis and Y-axis components of the vector $N_n$, respectively.

The angle $\theta c_n$, which is output as a command value for the C axis, varies in accordance with the inclination of the model surface, and is $\theta c_q$ at point $P1_q$, for example. Consequently, the measurement optical axes of the first and second detectors 5a and 5b are always perpendicular or nearly perpendicular to the model surface. According to the above method of determining the surface vectors $S1_n$ and $S2_n$ by using three points $P1_n$, $P2_n$ and $P1_{n-1}$, however, an accurate normal vector $N_n$ cannot be obtained in the case wherein the three points are located exactly or almost in a straight line.

Therefore, the three points are preferably selected in the following manner: First, measurement points P1 and P11 (corresponding to points $P1_n$ and $P1_{n-1}$ in FIG. 3) relating to the measured values of the first detector 5a sampled at the present and preceding sampling times, respectively, are selected as first and second points (see FIG. 5). Subsequently, it is determined whether or not a measurement point P2 (corresponding to $P2_n$) relating to the measured value of the second detector 5b sampled at the present sampling time satisfies both first and second conditions; the first condition being that an intersection $Pv$ of a perpendicular line extending from the point P2 perpendicularly to a straight line A(L) passing through the points P1 and P11 with a line segment L connecting the points P1 and P11 is situated on the line segment L, and the second condition being that a distance L2 between the point P2 and the straight line L is greater than or equal to a predetermined value. If the point P2 fulfills these two conditions, then it is selected as a third point.

Figure 5:
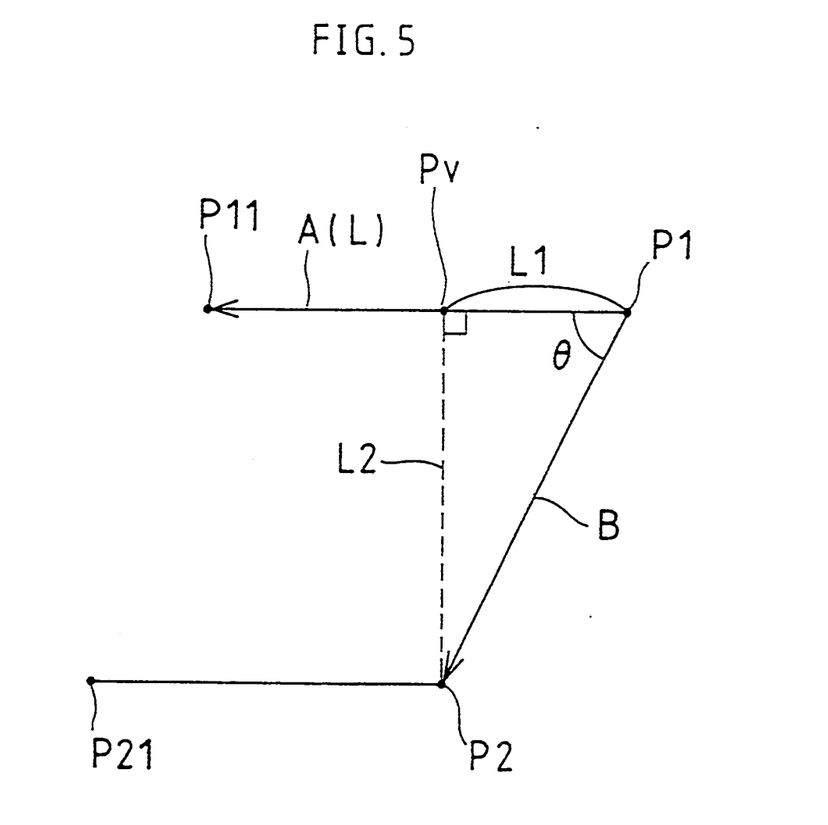
FIG. 5 is a diagram illustrating a process of selecting a third point by the tracing control device, for the calculation of the rotation angle of the tracer head.

If the measurement point P2 does not satisfy the conditions, a similar determination is made with regard to a measurement point P21 (corresponding to $P2_{n-1}$) relating to the previous measured value of the second detector 5b. If neither the point P2 nor P21 fulfills the conditions, a more suitable one of the points P2 and P21, for example, that point of which the distance to the straight line L is greater, is selected as the third point.

If a measurement point not satisfying the first condition is selected as the third point, the selected three points form an obtuse-angle triangle and the point P1 or P11 is close to the opposite side, and thus such a point selection is not suitable. On the other hand, if a measurement point of which the distance L2 to the straight line L is small and which does not satisfy the second condition is selected, it is close to the straight line L and thus is not suitable.

Figure 6:
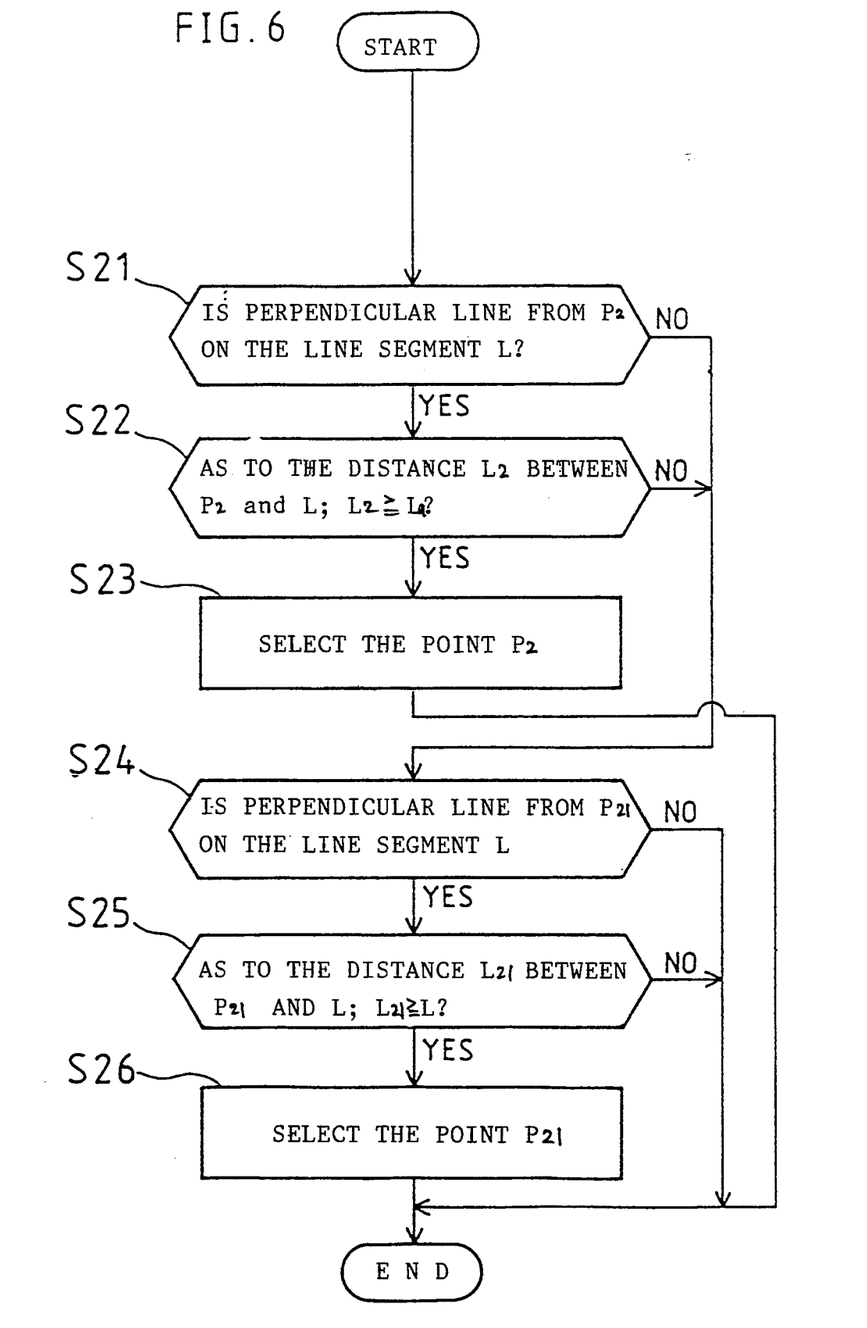
FIG. 6 is a flowchart of the selection process.

To select the third point according to the above-mentioned procedure, the processor 11 determines whether or not the intersection $Pv$ of the perpendicular line extending from the point P2 to the straight line L with the straight line L is on the line segment L (Step S21 in FIG. 6). To this end, first, a vector A(L)-A(Ax, Ay, Az) having a stare point at P1 and an end point at P11 and a vector B(Bx, By, Bz) having a start point at P1 and an end point at P2 are derived, and an inner product K (=AxBx+AyBy+AzBz) of the vectors A(L) and B is divided by the length $|A|$ of the vector A(L) to obtain the distance L1 $(=|B|\cos\theta=K/|A|)$ between the points P1 and P$_V$. Then, it is determined whether or not the distance L1 takes a value greater than or equal to zero and at the same time smaller than or equal to the length $|A|$ of the vector A. If the result of the determination is YES $(0 \leq L1 \leq |A|)$, then it is determined that the intersection P$_V$ is on the line segment L.

If the result of the determination in Step S21 is YES, it is determined whether or not the distance L2 $(=(|B|^2-L1^2)^{\frac{1}{2}})$ between the point P21 and the straight line L takes a value greater than or equal to a predetermined value La (Step S22). Since computation of square root $(|B|^2-L1^2)^{\frac{1}{2}}$ requires time, in practice a determination is made as to whether or not L2$^2$ takes a value greater than or equal to La$^2$. If the result of the determination in Step S22 is YES (L2$^2 \geq$La$^2$), then it means that the point P2 satisfies the aforementioned first and second conditions, and accordingly, the point P2 is selected as the third point (Step S23).

If one or both of the results of the determinations in Steps S21 and S22 are NO, it is determined whether or not the point P21 satisfies the first condition (Step S24), as in Step S21, and if the result of this determination is YES, it is determined whether or not the point P21 satisfies the second condition (Step S25), as in Step S22. If the result of the determination in Step S25 is YES, then it means that the point P21 fulfills both the first and second conditions, and therefore, the point P21 is selected as the third point (Step S26).

When neither the point P2 nor P21 satisfies the conditions, one of the points of which the distance to the straight line L is greater is selected as the third point. In practice, however, a situation that neither the point P2 nor P21 fulfills both the first and second conditions is very rare.

Figure 4:
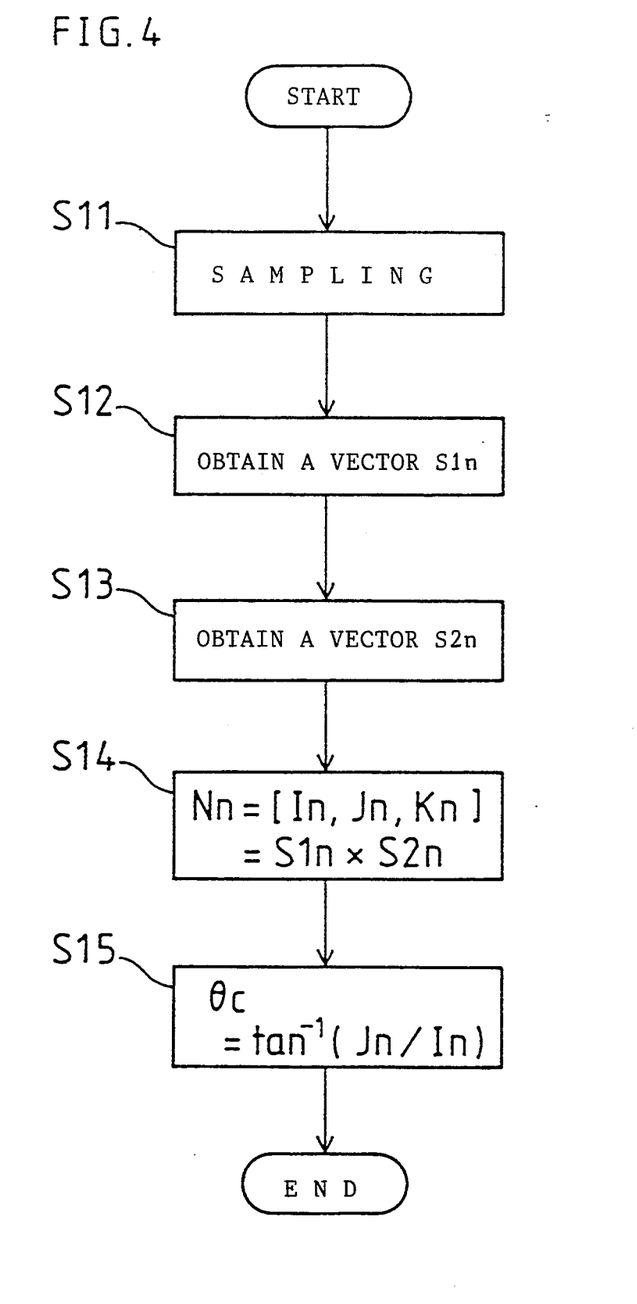
FIG. 4 is a flowchart of the process for calculating the rotation angle of the tracer head.

After three suitable points are selected in the above manner, the processor 11 executes Steps S12 to S15 in FIG. 4, to obtain an angle $\theta c_n$ between the projection N1$_n$ of the normal vector N$_n$ onto the X-Y plane and the X axis, and then generates a rotation command SC corresponding to the direction of the projection N1$_n$. The rotation command SC is converted into a digital value by the D/A converter 17c, and the resulting value is supplied to the servo amplifier 18c. The servo amplifier 18c drives the servomotor 32c in accordance with the rotation command SC, whereby the tracer head 4 is rotated around the C axis and positioned at the commanded rotational position $\theta c_n$. As a result, the measurement optical axes of the first and second detectors 5a and 5b are oriented exactly or nearly perpendicular to the model surface, and accordingly, the distance measuring accuracy and thus the tracing accuracy are improved.

As described above, while the table 31 is moved horizontally on the X-Y plane in the commanded tracing direction at the commanded tracing speed by the operation of the servomotors 32x, 32y and 32z, the measured value of the first detector 5a is fed back to the tracing control device 1 and the position of the Z-axis unit 36 along the Z-axis direction is controlled by the tracing control device 1 such that a distance 1a (FIG. 2) between the first detector 5a and the measurement point P1 on the surface of the model 6 is constant. The measurement point P1 remains unshifted even when the tracer head 4 is rotated, as mentioned above, and therefore, the distance 1 between the tracer head 4 and the model 6 can be maintained constant as the distance between the first detector and the model is controlled to a fixed value. As a result, the workpiece 35 on the table 31 is machined to the same shape as the model G by the tool 34 mounted to the Z-axis unit 36.

This invention is not limited to the above-described embodiment and various modifications may be made.

For example, although, in the foregoing embodiment, this invention is applied to the tracing control, it can be applied to digitizing control. Further, the embodiment uses a distance detector utilizing a reflected light amount, but an optical trigonometric distance detector, eddy-current type distance detector, ultrasonic distance detector, or the like may be used. Furthermore, in the embodiment, the two measurement points relating to the two points measured by the first detector 5a are selected as the first two points among the three points for calculating the normal vector, but arbitrary two points may be selected from among the four measurement points relating to the four values measured by the first and second detectors, taking account of the distance between the two detectors, the shape of the model, a required tracing accuracy, and other factors.

What is claimed is:

1. A noncontact tracing control device comprising:
   a first detector arranged to be rotatable around a rotary axis and movable relative to a model, in a direction parallel to said rotary axis, having a measurement axis extending obliquely with respect to said rotary axis, for measuring a distance therefrom to a point on a surface of the model in a noncontact fashion;
   a second detector arranged to be movable together with said first detector and having a measurement axis extending obliquely with respect to the rotary axis and shifted from the measurement axis of said first detector in a direction perpendicular to said rotary axis, for measuring a distance therefrom to another point on the surface of the model in a noncontact fashion;
   selecting means for selecting three measured distance values from among four measured distance values measured at four different points on an upper surface of the model which include first two values and second two values measured successively by said first and second detectors, respectively, at predetermined time intervals, while said first and second detectors are moved relative to the model;
   calculating means for calculating a normal vector of the surface of said model based on the three measured distance values, selected by the selecting means and for calculating an angular position of a projection of the normal vector on a plane perpendicular to said rotary axis; and
   positioning means for positioning said first and second detectors at the angular position thus calculated.

2. A noncontact tracing control device according to claim 1, which further comprises a tracer head rotatable around said rotary axis and movable relative to said model in a direction parallel to said rotary axis, and wherein said first and second detectors are mounted to the tracer head.

3. A noncontact tracing control device according to claim 1, which further comprises:

sampling means for periodically sampling the measured distance values measured by said first and second detectors; and storing means for storing the measured distance values sampled by said sampling means.

4. A noncontact tracing control device according to claim 1, wherein said calculating means calculates coordinates of three different points on the surface of said model, based on said three measured distance values, calculates first and second vectors starting at one of the three points and leading to the other two points, respectively, and derives an outer product of said first and second vectors as said normal vector.

5. A noncontact tracing control device according to claim 4, wherein said selecting means selects two points from among four points relating to said four measured distance values as first and second points, and then selects one point from among the remaining two points as a third point on condition that the point selected satisfies a first condition that an intersection of a perpendicular line extending perpendicularly to a straight line passing through said first and second points with said straight line is located on a line segment connecting said first and second points and a second condition that a distance to said straight line is greater than or equal to a predetermined value.

6. A noncontact tracing control device according to claim 5, wherein said selecting means selects a more suitable one of said remaining two points as the third point when neither of the remaining two points satisfies said first and second conditions.

* * * * *

UNITED STATES PATENT AND TRADEMARK OFFICE
CERTIFICATE OF CORRECTION

PATENT NO. : 5,345,687
DATED :
INVENTOR(S) : September 13, 1994

Hitoshi MATSUURA et al.

It is certified that error appears in the above-indentified patent and that said Letters Patent is hereby corrected as shown below:

[57] In the ABSTRACT, line 25, change "above mentioned" to --above-mentioned--.

Column 1, line 15, change "Is" to --is--; and line 21, change "ankle" to --angle--.

Column 2, line 63, change "time" to --the--.

Column 4, line 68, change "stare" to --start--.

Signed and Sealed this

Fourth Day of April, 1995

*Attest:*

BRUCE LEHMAN

*Attesting Officer*     *Commissioner of Patents and Trademarks*